United States Patent
Shimura

(10) Patent No.: US 11,372,393 B2
(45) Date of Patent: Jun. 28, 2022

(54) NUMERICAL CONTROL DEVICE

(71) Applicant: FANUC CORPORATION, Yamanashi (JP)

(72) Inventor: Kazuya Shimura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 113 days.

(21) Appl. No.: 17/080,014

(22) Filed: Oct. 26, 2020

(65) Prior Publication Data

US 2021/0141363 A1 May 13, 2021

(30) Foreign Application Priority Data

Nov. 11, 2019 (JP) .............................. JP2019-204016

(51) Int. Cl.
*G05B 19/4155* (2006.01)
(52) U.S. Cl.
CPC ............... *G05B 19/4155* (2013.01); *G05B 2219/49098* (2013.01)
(58) Field of Classification Search
None
See application file for complete search history.

(56) References Cited

FOREIGN PATENT DOCUMENTS

| JP | 10-320027 | | 12/1998 |
| JP | 2015-179481 | | 10/2015 |
| JP | 2015-207147 | | 11/2015 |
| JP | 2015207147 | A * | 11/2015 |

* cited by examiner

*Primary Examiner* — Ryan A Jarrett
(74) *Attorney, Agent, or Firm* — Wenderoth, Lind & Ponack, L.L.P.

(57) ABSTRACT

A numerical control device for a machine tool including a key-in buffer storage unit storing a key-input character, a function abbreviation storage unit storing a function abbreviation and a correspondence relationship between the function abbreviation and a program code, a function abbreviation candidate display unit retrieving a function abbreviation candidate from the number of characters matched between a character and the function abbreviation, a function abbreviation character string complementing unit complementing a character before key-input of the function abbreviation candidate when the key-input character is a part of the function abbreviation candidate and the number of the function abbreviation candidates is one and returning the complemented function abbreviation candidate to the key-in buffer storage unit, and a function abbreviation-code conversion unit converting a character string indicating the function abbreviation candidate returned to the key-in buffer storage unit after the complement into a program code based on the correspondence relationship.

3 Claims, 9 Drawing Sheets

FIG. 3

| G CODES | FUNCTION ABBREVIATIONS | FUNCTIONS | FUNCTIONS (ENGLISH) |
|---|---|---|---|
| G00 | POS,RAPID | POSITIONING, RAPID TRAVERSE | Positioning |
| G01 | LINE,CUT | LINEAR INTERPOLATION, CUTTING FEED | Linear interpolation |
| G02 | CIRCLE | CIRCULAR INTERPOLATION (CLOCKWISE) CW | Circular interpolation |
| G03 | CCIRCLE | CIRCULAR INTERPOLATION (COUNTERCLOCKWISE) CCW | Circular interpolation |
| G90 | ABS | ABSOLUTE PROGRAMMING | Absolute programming |
| G91 | INC | INCREMENTAL PROGRAMMING | Incremental programming |
| G92 | SETWORKER | SETTING FOR WORKPIECE COORDINATE SYSTEM | Setting for workpiece coordinate system |
| G17 | XYPLANE | XpYp PLANE SELECTION | XpYp plane selection |
| G18 | ZXPLANE | ZpXp PLANE SELECTION | ZpXp plane selection |
| G19 | YZPLANE | YpZp PLANE SELECTION | YpZp plane selection |

| PREDICTED FUNCTION CANDIDATE | |
|---|---|
| ¥CUT¥ : G01 LINEAR INTERPOLATION, CUTTING FEED | A > ¥C_ |
| ¥CIRCLE¥ : G02 CIRCULAR INTERPOLATION (CLOCKWISE) | |
| ¥CCIRCLE¥ : CIRCULAR INTERPOLATION (COUNTERCLOCKWISE) | EDIT**** *** ***    ***    12:00:00 |

| PREDICTED FUNCTION CANDIDATE | |
|---|---|
| ¥CIRCLE¥ : G02 CIRCULAR INTERPOLATION (CLOCKWISE) | A > ¥CI_ |

| | |
|---|---|
| | A > ¥CIRCLE¥_ |

FIG. 4C

```
A >  ¥CIRCLE¥_
```

↓ INPUT KEY

```
O1212 ;
G92 X0 Y0 ;
G00 X20.0 Y30.0 ;
G02 %
```

NUMERICAL CONTROL DEVICE

This application is based on and claims the benefit of priority from Japanese Patent Application No. 2019-204016, filed on 11 Nov. 2019, the content of which is incorporated herein by reference.

BACKGROUND OF THE INVENTION

Field of the Invention

The present invention relates to a numerical control device.

Related Art

G codes used in a numerical control device are expressed in the same format of an address+a numerical value. Therefore, it has been difficult for an end user of the numerical control device to memorize the G codes and it has been a burden for the end user to memorize the same. Further, when a desired G code is not known, program creation time increases, and therefore there is an increasing need for an intuitive command method.

In this respect a technique is known which relates to program editing of machine tools, which aims at reducing time and effort of a worker, and in which, when a first character of a command code is input, a command code candidate list matching the character and descriptions are displayed, and then the target command code is selected therefrom, so that the command code is inserted into a program (for example, see Japanese Unexamined Patent Application, Publication No. 2015-207147).

Further, a technique is known which gives compatibility to output information of different types of devices and gives compatibility to input/output information of different types of software design tools to thereby enable efficient development (for example, see Japanese Unexamined Patent Application, Publication No. 2015-179481).

Further, a technique is known which, even when the specifications of command codes are different among manufacturers, enables generation of processing programs controlling a plurality of CNCs having different specifications from a single processing program by converting the different command codes into each manufacturer's own command codes using a conversion table (for example, see Japanese Unexamined Patent Application, Publication No. H10-320027).

Patent Document 1: Japanese Unexamined Patent Application, Publication No. 2015-207147
Patent Document 2: Japanese Unexamined Patent Application, Publication No. 2015-179481
Patent Document 3: Japanese Unexamined Patent Application, Publication No. H10-320027

SUMMARY OF THE INVENTION

In the field of numerical control devices, there have been problems to be solved in which conventional command methods require an input of a function abbreviation without a key and it has been troublesome to input the function abbreviation when the function abbreviation is longer than a G code. Therefore, there is a demand for a numerical control device which implements a command method allowing for efficient and easy input of the function abbreviations corresponding to the G codes when editing a processing program containing the G codes and the like.

It is an object of the present invention to provide a numerical control device allowing for efficient and easy input of a function abbreviation.

One aspect of the present disclosure is a numerical control device for a machine tool including a control unit and a storage unit, in which the storage unit includes a key-in buffer storage unit storing a key-input character, and a function abbreviation storage unit storing a function abbreviation and a correspondence relationship between the function abbreviation and a program code and the control unit includes an input processing unit storing the key-input character in the key-in buffer storage unit, a function abbreviation candidate display unit retrieving a function abbreviation candidate from a number of characters matched between a character stored in the key-in buffer storage unit and the function abbreviation stored in the function abbreviation storage unit, a function abbreviation character string complementing unit complementing a character before key-input of the function abbreviation candidate when the key-input character is a part of the function abbreviation candidate and the number of the function abbreviation candidates is one and returning the complemented function abbreviation candidate to the key-in buffer storage unit, and a function abbreviation-code conversion unit converting a character string indicating the function abbreviation candidate returned to the key-in buffer storage unit after the complement into a program code based on the correspondence relationship.

One aspect enables an efficient and easy input of a function abbreviation.

BRIEF DESCRIPTION OF THE DRAWINGS

FIG. 3 is a table illustrating an example of a correspondence relationship between program codes and function abbreviations stored by a function abbreviation storage unit provided in the numerical control device of one embodiment;

FIG. 4C is a conversion example when the function abbreviation of the numerical control device of one embodiment is registered in a program storage unit;

DETAILED DESCRIPTION OF THE INVENTION

Hereinafter, an embodiment of the present invention is described by referring to FIGS. 1 to 7.

1 Configuration of Embodiment

Figure 1:
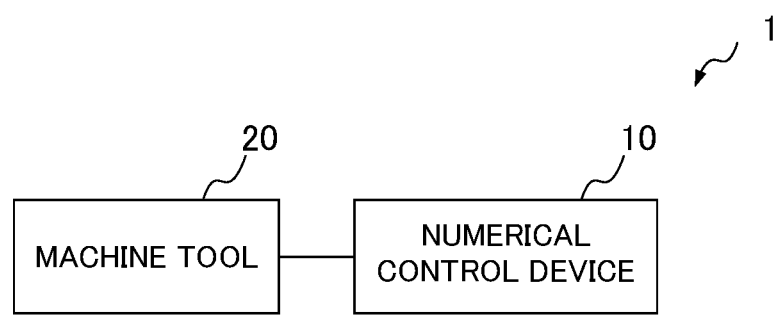
FIG. 1 is an overall configuration diagram of a numerical control system of one embodiment.

FIG. 1 is an overall configuration diagram of a numerical control system 1 according to this embodiment. The numerical control system 1 includes a numerical control device 10 and a machine tool 20. The numerical control device 10 and the machine tool 20 form a one-to-one set and are communicatively connected to each other. The numerical control device 10 and the machine tool 20 may be directly connected through a connection interface or may be connected through a network, such as a LAN (Local Area Network).

The numerical control device 10 is a device for controlling the machine tool 20 to thereby cause the machine tool 20 to perform a predetermined operation. For example, the numerical control device 10 controls a spindle and a drive shaft of the machine tool 20 according to a processing program.

The machine tool 20 is a machine tool performing pre-determined processing, such as machining, to workpieces, such as components, based on an operation command output by the numerical control device 10.

Figure 2:
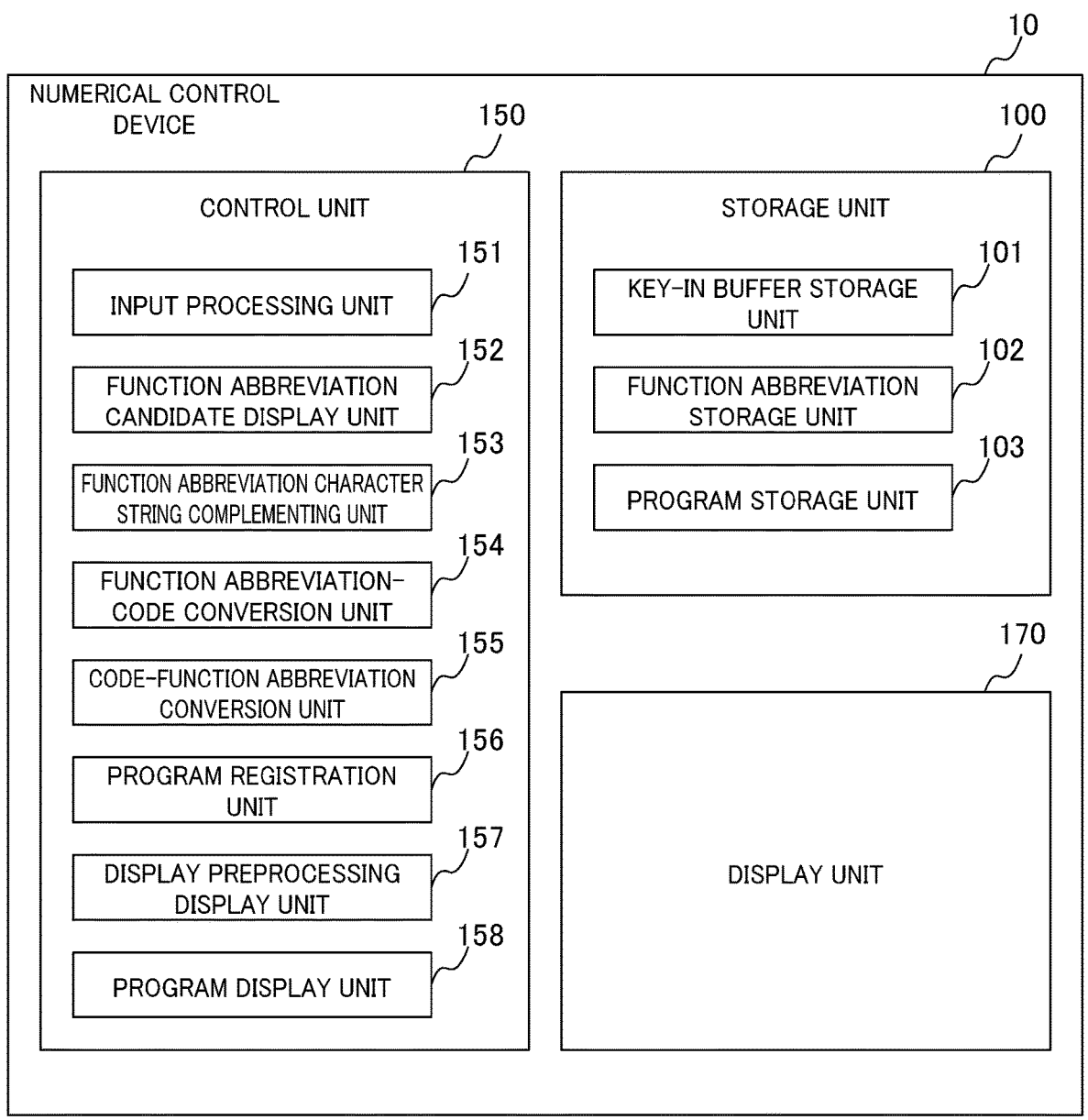
FIG. 2 is a functional block diagram of the numerical control device of one embodiment.

FIG. 2 is a functional block diagram of the numerical control device 10. The numerical control device 10 includes a storage unit 100, a control unit 150, and a display unit 170.

The storage unit 100 includes a key-in buffer storage unit 101, a function abbreviation storage unit 102, and a program storage unit 103.

The key-in buffer storage unit 101 stores a character input into a key-in buffer displayed on the display unit 170 described later.

The function abbreviation storage unit 102 stores function abbreviations and a correspondence relationship between the function abbreviations and program codes. FIG. 3 illustrates an example of the correspondence relationship between the program codes and the function abbreviations stored by the function abbreviation storage unit 102. As illustrated in FIG. 3, the program codes and the function abbreviations are associated with each other but the correspondence relationship is not limited to one-to-one correspondence. For example, in a case where "POS" or "RAPID" is input as the function abbreviation into the key-in buffer, each input is converted into a G code "G00".

Although the G codes are illustrated as the program codes in the example of FIG. 3, other codes, such as M codes, may be acceptable without being limited thereto. Further, although G code functions corresponding to the function abbreviations, and functions written in English are illustrated in the table of FIG. 3, these items are not essential Further, the function abbreviation storage unit 102 may also store, in addition to the correspondence relationship between the G codes and the function abbreviations as illustrated in FIG. 3, the correspondence relationship between commands of other manufacturers and function abbreviations.

The program storage unit 103 stores a program after the function abbreviations are converted into codes by a function abbreviation-code conversion unit 154 described later.

The control unit 150 has a CPU, a ROM, a RAM, a CMOS memory, and the like, which are communicatively configured to each other through a bus and are known to a person skilled in the art.

The CPU is a processor which entirely controls the numerical control device 10. The CPU is configured to read a system program and an application program stored in the ROM through a bus to control the entire numerical control device 10 according to the system program and the application program to thereby cause the control unit 150 to realize functions of an input processing unit 151, a function abbreviation candidate display unit 152, a function abbreviation character string complementing unit 153, a function abbreviation-code conversion unit 154, a code-function abbreviation conversion unit 155, a program registration unit 156, a display preprocessing display unit 157, and a program display unit 158 as illustrated in FIG. 2.

The input processing unit 151 stores a character key-input into the key-in buffer displayed on the display unit 170 described later in the key-in buffer storage unit 101.

The function abbreviation candidate display unit 152 retrieves a function abbreviation candidate from data stored in the function abbreviation storage unit 102 based on the number of characters matched between the character stored in the key-in buffer storage unit 101 and the function abbreviations stored in the function abbreviation storage unit 102, and then displays the function abbreviation candidate on the display unit 170 described later.

Figures 4A, 4B:
FIG. 4A is a display example of a key-in buffer and a prediction unit displayed on a display unit of the numerical control device of one embodiment.
FIG. 4B is a complement example of a character string in the key-in buffer displayed on the display unit of the numerical control device of one embodiment.

FIG. 4A illustrates a display example by the function abbreviation candidate display unit 152. When "¥C" is input into the key-in buffer as illustrated in FIG. 4A, a function abbreviation candidate stored in the function abbreviation storage unit 102 is retrieved based on the number of characters matching "C", and then displayed on a prediction unit located near the key-in buffer in the display unit 170. In the example illustrated in FIG. 4A, three function abbreviation candidates of "¥CUT¥", "¥CIRCLE¥", and "¥CCIRCLE¥" are displayed on the prediction unit.

When the character key-input into the key-in buffer is a part of the function abbreviation candidate and the number of the function abbreviation candidates retrieved by the function abbreviation candidate display unit 152 is one, the function abbreviation character string complementing unit 153 complements a character string before key-input of the function abbreviation candidate and returns the complemented character string to the key-in buffer storage unit 101. In more detail, a function abbreviation candidate word is passed from the function abbreviation candidate display unit 152 to the function abbreviation character string complementing unit 153, and then the function abbreviation character string complementing unit 153 determines whether a character string is complemented to the word. When the number of the function abbreviation candidates is one, a complement key is pressed by an end user of the numerical control device 10, so that a character string is complemented when the function abbreviation is incomplete.

FIG. 4B illustrates a complement example by the function abbreviation character string complementing unit 153. As illustrated in FIG. 4B, when "¥CI" is input into the key-in buffer, "CIRCLE", which is the only function abbreviation candidate, is displayed based on the number of characters matching "CI". Then, characters in the function abbreviation that have not been key-input are "RCLE¥". Therefore, "RCLE¥" is automatically and additionally input into the key-in buffer and the key-in buffer storage unit 101 by pressing the complement key, so that complement processing is performed.

Hereinafter, the function abbreviation candidate display unit 152 and the function abbreviation character string complementing unit 153 are also collectively referred to as a "function abbreviation candidate retrieval unit".

After the character string is complemented by the function abbreviation character string complementing unit 153, the function abbreviation-code conversion unit 154 converts the character string illustrating the function abbreviation candidate returned to the key-in buffer storage unit 101 into a program code using the correspondence relationship between the program codes and the function abbreviation candidates stored in the function abbreviation storage unit 102. In this embodiment, as an example, when an INPUT key is pressed, the function abbreviation-code conversion unit 154 determines whether the character string input into the key-in buffer storage unit 101 is a function abbreviation word, and then, when the character string is the function abbreviation word, converts the function abbreviation into a program code.

Figure 4C:
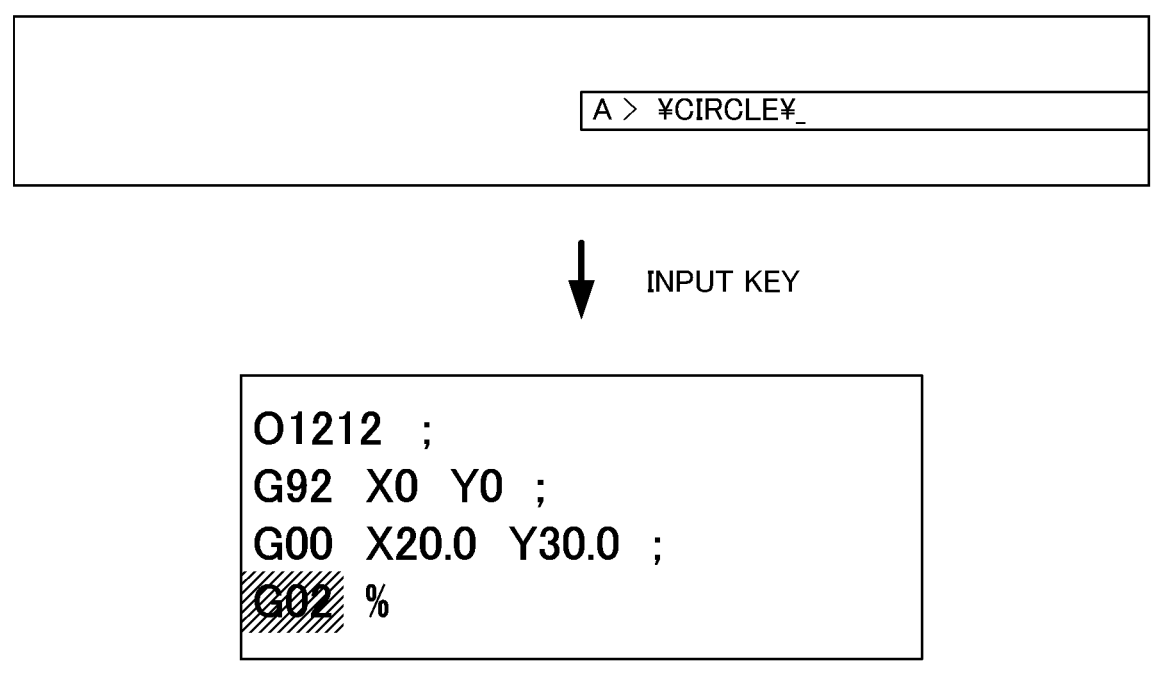

FIG. 4C illustrates a conversion example by the function abbreviation-code conversion unit 154. By pressing the INPUT key in a state where the display of the key-in buffer is changed to "¥CIRCLE¥", the function abbreviation is converted into a G code "G02".

The code-function abbreviation conversion unit 155 selects whether a program is displayed using any of the program codes and the function abbreviations, and then, when the program is displayed using the function abbreviations, converts the program codes into the function abbreviations using the correspondence relationship between the program codes and the function abbreviations stored in the function abbreviation storage unit 102.

The program registration unit 156 registers the program in which the function abbreviations are converted into the codes by the function abbreviation-code conversion unit 154 in the program storage unit 103.

The display preprocessing display unit 157 selects a word to be displayed on the display unit 170 from a word contained in the program registered in the program storage unit 103 or a word to be input. In more detail, the display preprocessing display unit 157 selects a part other than the program code in the program as a word to be displayed as it is on the display unit 170 and, when the program code is not converted into the function abbreviation, selects the program code as the word to be displayed on the display unit 170 and, when the program code is converted into the function abbreviation by the code-function abbreviation conversion unit 155, selects the function abbreviation after conversion as the word to be displayed on the display unit 170.

The program display unit 158 displays the program on the display unit 170 described later based on the word selected by the display preprocessing display unit 157.

Figure 4D:
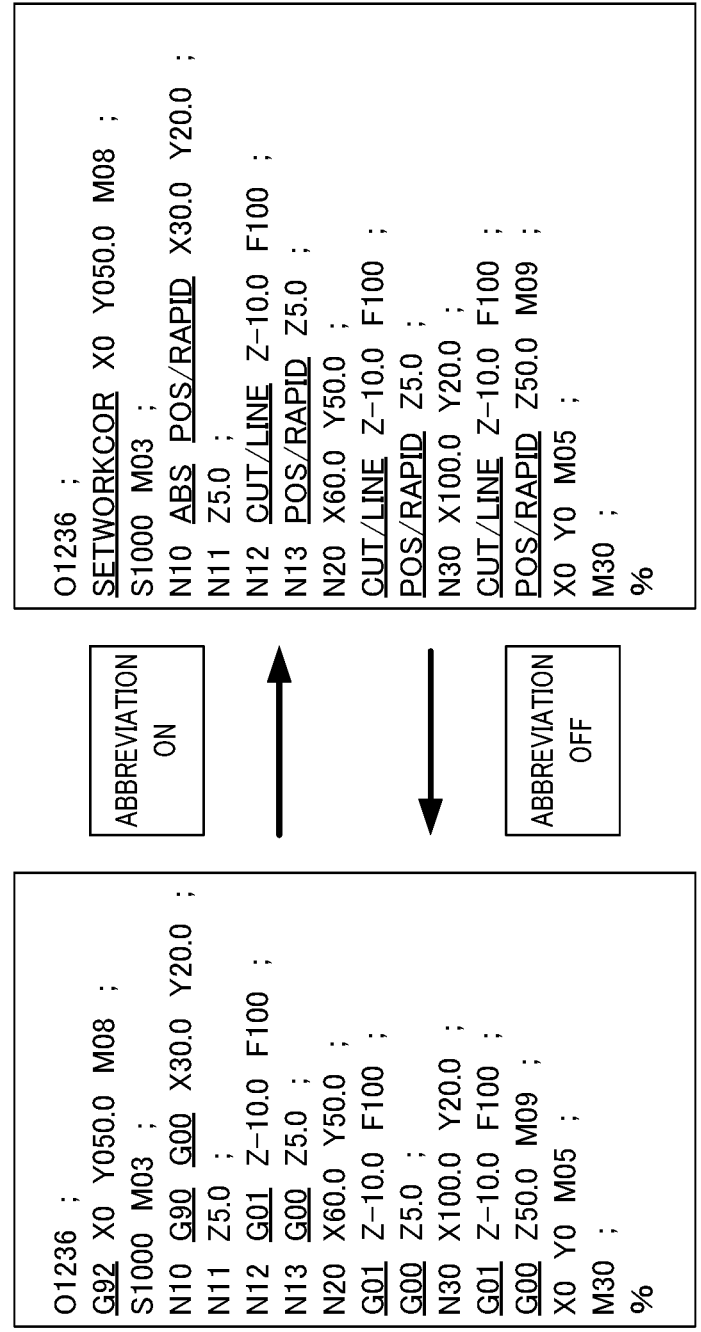
FIG. 4D is a display example of a program displayed on the display unit of the numerical control device of one embodiment.

FIG. 4D illustrates an example of switching of the display of the program by the display preprocessing display unit 157 and the program display unit 158. In the display unit 170, the program is displayed in a state where the program codes are converted into the function abbreviations by pressing an "abbreviation ON" key and the program is displayed in a state where the function abbreviations are converted into the program codes by pressing an "abbreviation OFF" key.

In the example illustrated in FIG. 4D, the program is displayed in a state where only G code parts in the program displayed using the G codes are converted into the function abbreviations by pressing the "abbreviation ON" key and the display of the other character strings do not change. Further, the program is displayed in a state where only function abbreviation parts in the program displayed using the function abbreviations are converted into the G codes by pressing the "abbreviation OFF" key and the display of the other character strings do not change.

The display unit 170 is a device displaying the key-in buffer, the function abbreviation candidate, the program, and the like and may contain a CRT (Cathode Ray Tube), an LCD (Liquid Crystal Display), or the like, for example. In that case, input devices, such as a keyboard, a mouse, a controller, and various buttons, such as a switch button, for example, operable to the display position of the display unit 170 may be provided separately from the display unit 170.

2 Operation of Embodiment

Figure 5:
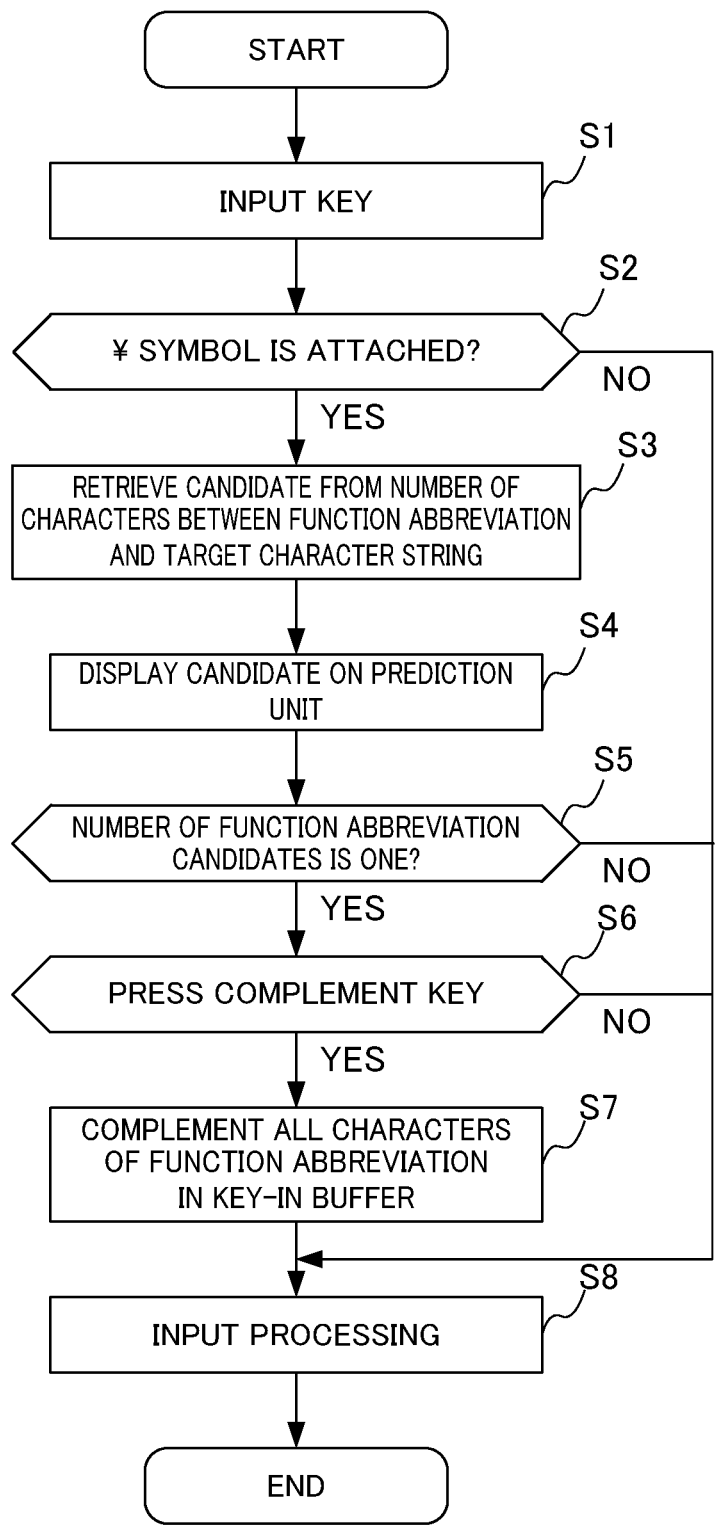
FIG. 5 is a flow chart illustrating an operation of the numerical control device of one embodiment.
Figure 6:
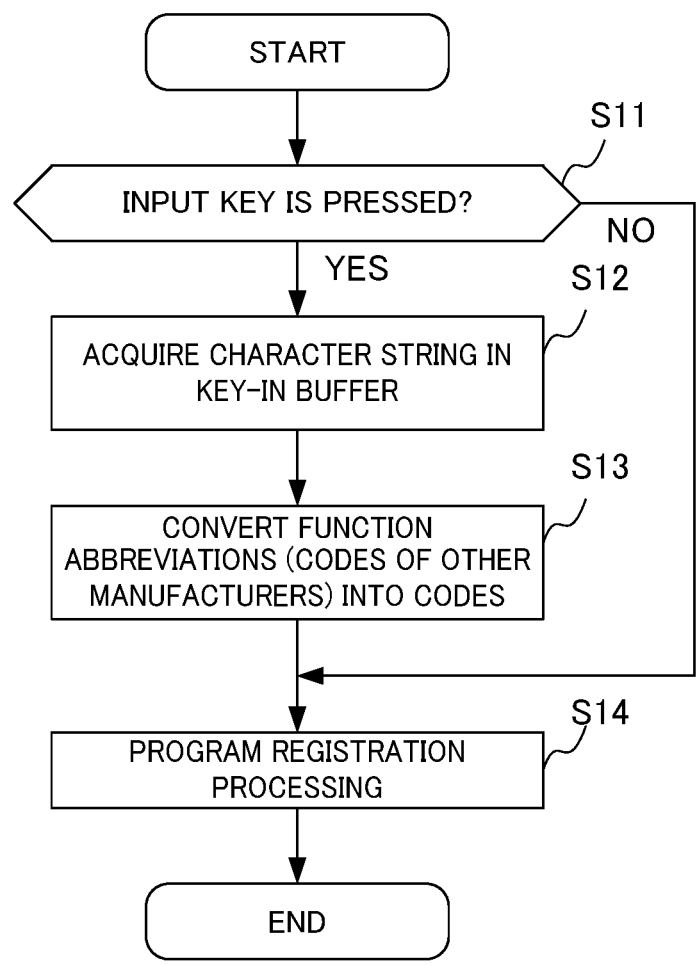
FIG. 6 is a flow chart illustrating an operation of the numerical control device of one embodiment.
Figure 7:
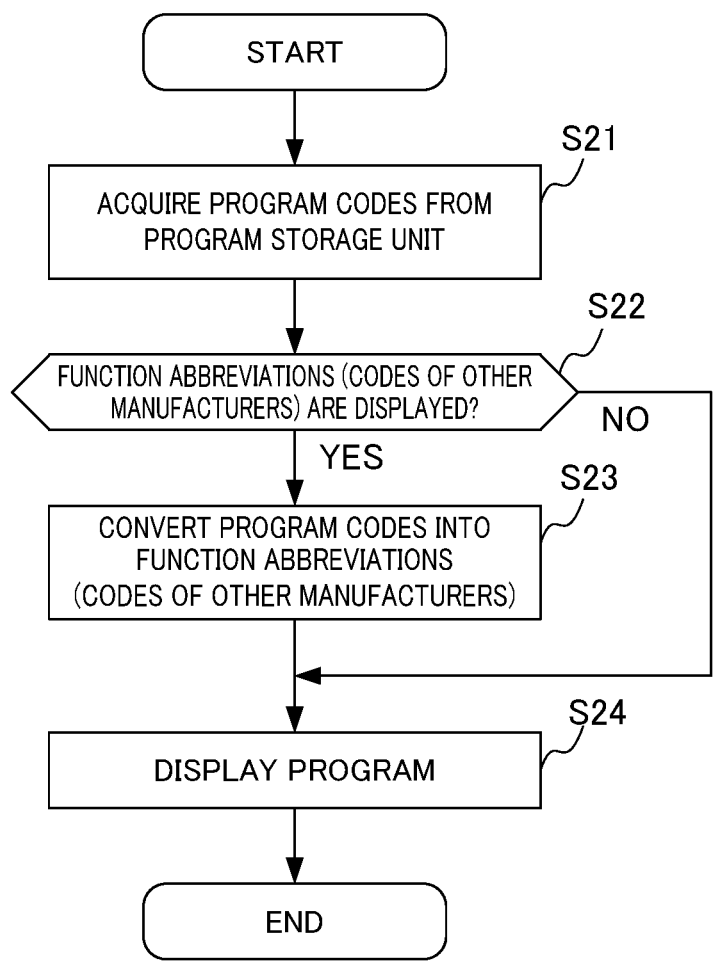
FIG. 7 is a flow chart illustrating an operation of the numerical control device of one embodiment.

FIGS. 5 to 7 are flow charts illustrating operations of the numerical control device 10. In more detail, FIG. 5 is a flow chart for displaying and complementing a function abbreviation. FIG. 6 is a flow chart for registering a program. FIG. 7 is a flow chart for switching the display of a program.

Referring to FIG. 5, an end user of the numerical control device 10 key-inputs a character string into the key-in buffer in Step S1 when displaying and complementing a function abbreviation.

In Step S2, when the sign of "¥" is attached to the character string key-input into the key-in buffer (S2: YES), the processing shifts to Step S3. When the sign of "¥" is not attached (S2: NO), the processing shifts to Step S8.

In Step S3, the function abbreviation candidate retrieval unit retrieves a function abbreviation candidate from the number of characters matched between the function abbreviation and a target word key-input into the key-in buffer.

In Step S4, the function abbreviation candidate display unit 152 displays the function abbreviation candidate on a prediction unit.

In Step S5, when the number of the function abbreviation candidates displayed on the prediction unit is one (S5: YES), the processing shifts to Step S6. Otherwise (S5: NO), the processing shifts to Step S8.

In Step S6, when the end user of the numerical control device 10 presses the complement key (S6: YES), the processing shifts to Step S7. When the end user does not press the complement key (S6: NO), the processing shifts to Step S8.

In Step S7, the function abbreviation character string complementing unit 153 complements all characters of the function abbreviation in the key-in buffer.

In Step S8, the input processing unit 151 stores the characters displayed on the key-in buffer in the key-in buffer storage unit 101 as input processing.

Referring to FIG. 6, when the end user of the numerical control device 10 presses the INPUT key in Step S11 in registering a program (S11: YES), the processing shifts to Step S12. When the end user of the numerical control device 10 does not press the INPUT key (S11: NO), the processing shifts to Step S14.

In Step S12, the control unit 150 acquires a character string in the key-in buffer.

In Step S13, the function abbreviation-code conversion unit 154 converts function abbreviations or commands of other manufacturers into the program codes.

In Step S14, the program registration unit 156 registers a program after the function abbreviations or the commands of other manufacturers are converted into the program codes in the program storage unit 103.

Referring to FIG. 7, the code-function abbreviation conversion unit 155 acquires the program codes from the program storage unit 103 in Step S21 when switching the display of the program.

In Step S22, when the function abbreviations or the commands of other manufacturers are displayed (S22: YES), the processing shifts to Step S23. Otherwise (S22: NO), the processing shifts to Step S24.

In Step S23, the code-function abbreviation conversion unit 155 converts the program codes into the function abbreviations or the commands of other manufacturers.

In Step S24, the program display unit 158 displays the program after the program codes are converted into the function abbreviations or the commands of other manufacturers on the display unit 170.

3 Effects Exhibited by Embodiment

The numerical control device 10 of this embodiment enables editing of a program after it is confirmed whether the function is desired by confirming prediction candidates of the function abbreviations.

Further, the numerical control device 10 of this embodiment enables input without time and effort even in a case of a long function abbreviation.

Further, the numerical control device 10 of this embodiment enables intuitive grasp of functions by displaying the program codes, such as the G codes or the M codes, by the function abbreviations.

Further, the numerical control device 10 of this embodiment also enables reverse conversion from the function abbreviations to the program code, such as the G codes or the M codes, and thus there is no impediment for an end user who is accustomed to the indication of the G codes or the M codes.

Further, the numerical control device 10 of this embodiment enables the registration of a program after function abbreviations of other manufacturers are converted into the program codes, such as the G codes or the M codes.

Due to these operational effects, an end user of the numerical control device 10 can easily create a processing program.

Although the embodiment described above is a preferable embodiment of the present invention, the scope of the present invention is not limited to the embodiment described above. The embodiment can be implemented in variously altered forms without deviating from the gist of the present invention.

In the embodiment described above, the function abbreviation character string complementing unit 153 complements a character before key-input of the function abbreviation candidate in the key-in buffer storage unit 101 and the function abbreviation-code conversion unit 154 converts the character string illustrating the function abbreviation into the program code after the complement using the correspondence relationship between the program codes and the function abbreviation candidates stored in the function abbreviation storage unit 102 but the present invention is not limited thereto.

For example, when a function abbreviation candidate is narrowed down to one candidate with an increase in the number of characters stored in the key-in buffer storage unit 101, the function abbreviation-code conversion unit 154 may automatically complement a character string before key-input of the function abbreviation candidate and convert the character string illustrating the function abbreviation candidate into the program code.

EXPLANATION OF REFERENCE NUMERALS 1 numerical control system
10 numerical control device
20 machine tool
100 storage unit
101 key-in buffer storage unit
102 function abbreviation storage unit
103 program storage unit
150 control unit
151 input processing unit
152 function abbreviation candidate display unit
153 function abbreviation character string complementing unit
154 function abbreviation-code conversion unit
155 code-function abbreviation conversion unit
156 program registration unit
157 display preprocessing display unit
158 program display unit
170 display unit

What is claimed is:

1. A numerical control device for machine tool comprising:
 a control unit; and
 a storage unit, wherein
 the storage unit includes
  a key-in buffer storage unit storing a key-input character, and
  a function abbreviation storage unit storing a function abbreviation and a correspondence relationship between the function abbreviation and a program code, and
 the control unit includes
  an input processing unit storing the key-input character in the key-in buffer storage unit,
  a function abbreviation candidate display unit retrieving a function abbreviation candidate from a number of characters matched between a character stored in the key-in buffer storage unit and the function abbreviation stored in the function abbreviation storage unit,
  a function abbreviation character string complementing unit complementing a character before key-input of the function abbreviation candidate when the key-input character is a part of the function abbreviation candidate and a number of the function abbreviation candidates is one and returning the complemented function abbreviation candidate to the key-in buffer storage unit, and
  a function abbreviation-code conversion unit converting a character string indicating the function abbreviation candidate returned to the key-in buffer storage unit after the complement into a program code based on the correspondence relationship.

2. The numerical control device according to claim 1, wherein
 the function abbreviation storage unit stores a correspondence relationship between a command of another manufacturer and a function abbreviation.

3. A numerical control device for a machine tool comprising:
 a control unit; and
 a storage unit, wherein
 the storage unit includes
  a program storage unit storing a program, and
  a function abbreviation storage unit storing a function abbreviation and a correspondence relationship between the function abbreviation and a program code, and
 the control unit includes
  a code-function abbreviation conversion unit selecting whether the program is displayed using any of the program code and the function abbreviation, and then, when the program is displayed using the function abbreviation, converting the program code in the program into the function abbreviation based on the correspondence relationship, a display preprocessing display unit selecting a part other than the program code in the program as a word to be displayed as it is on a display device and, when the program code is not converted, selecting the program code as the word to be displayed on the display device and, when the program code is converted into the function abbreviation, selecting the function abbreviation after conversion as the word to be displayed on the display device, and a program display unit displaying the word selected by the display preprocessing display unit on the display device.

* * * * *